Oct. 23, 1923.
L. WERTHEIMER
COFFEE URN
Filed Aug. 2, 1922
1,471,933
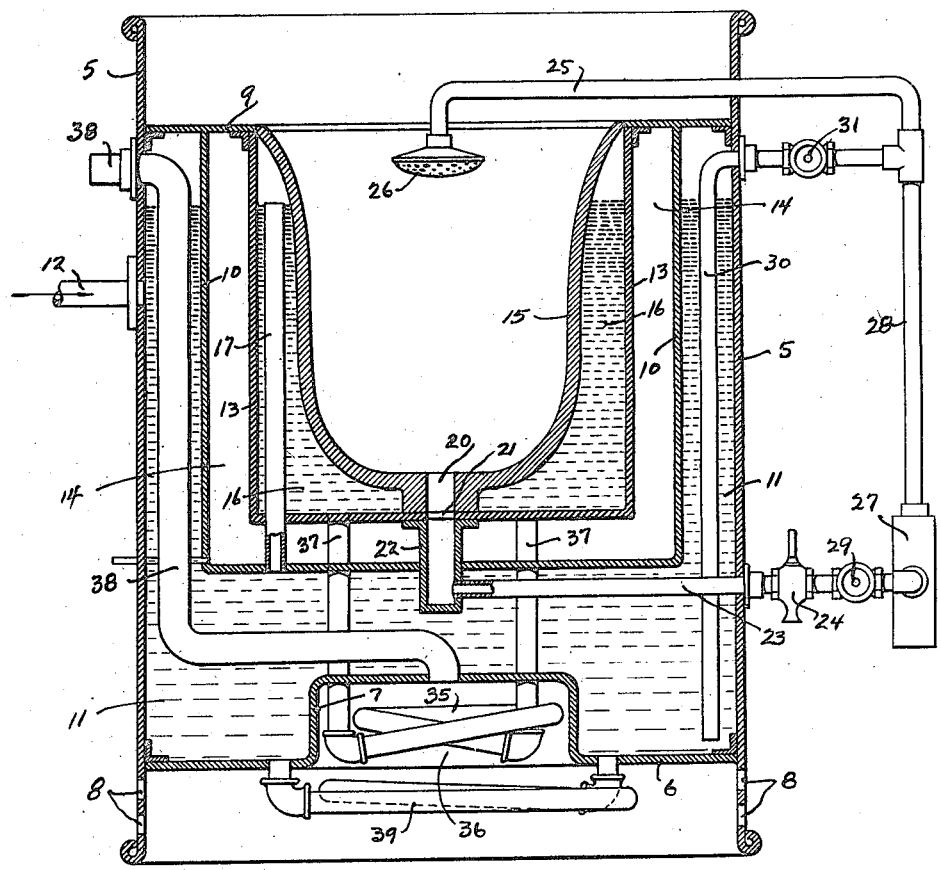
INVENTOR
Leo Wertheimer
BY
ATTORNEY Patented Oct. 23, 1923.

1,471,933

UNITED STATES PATENT OFFICE.

LEO WERTHEIMER, OF BUFFALO, NEW YORK.

COFFEE URN.

Application filed August 2, 1922. Serial No. 579,111.

*To all whom it may concern:*

Be it known that I, LEO WERTHEIMER, a citizen of the United States of America, residing in the city of Buffalo, county of Erie, and State of New York, have invented certain new and useful Improvements in Coffee Urns, of which the following is a full, clear, and exact description.

My invention relates generally to coffee urns, and more particularly to that type of urn in which the coffee may be circulated through the urn and heated water added to it.

The principal object of my invention has been to provide a device of this nature having a water jacket for the coffee receptacle and a separate water jacket for the exterior of the urn.

Another object has been to provide an air space separating the two water jackets, whereby water added to the liquid coffee will be preheated, and the temperature of the liquid coffee will not be reduced by such addition of water.

Another object has been to provide a device in which the water in the jackets shall be brought into intimate contact with the heating means of the urn, whereby the highest efficiency may be obtained.

Furthermore, it has been an object to provide a flue for conducting a portion of the heat from the heating means through the water of the outer jacket.

The above objects and advantages have been accomplished by the device shown in the accompanying drawings, the single figure of which shows a vertical sectional elevation of the device.

The device comprises an outer casing 5, which is provided with a bottom 6 having a cup-shaped central portion 7 to be hereinafter described. The bottom 6 is arranged at a suitable distance above the lower edge of the casing so as to accommodate the heating means of the urn. The outer casing below the bottom 6 is provided with a plurality of apertures 8. The outer casing is also provided with a top 9, arranged some distance below the upper edge thereof.

Supported by the top 9 is a jacket 10 which is arranged in interspaced relation with the outer casing 5 and is very much shorter than the casing 5, whereby a water-space 11 is provided. A water inlet 12 is connected to the outer casing, whereby water may be supplied to the water-space 11. Arranged within the jacket 10 is an inner jacket 13. This jacket is also supported by the top 9, and is in interspaced relation with the jacket 10, whereby an air-space 14 is provided. The inner jacket 13 is shorter than the jacket 10, so that the air-space extends across the bottom of the inner jacket as well as around the sides thereof. A coffee receptacle 15 is disposed within the inner jacket 13, and a water-space 16 is provided around the coffee urn. An overflow pipe 17 is carried by the bottom of the jacket 10, and passes through the bottom of the inner jacket 13 and up within the water-space 16 to a point near the top thereof. Water is thus supplied to the water-space 16 by water from the water-space 11. It will be seen that the water-spaces 11 and 16 are separated by the dead air-space 14, so that when the water in the space 11 is replenished by water of a lower temperature, the temperature of the water within the space 16 will not be affected by the reduced temperature of the water in the space 11. A vent pipe 32 having a small opening is connected to the jacket 10 so as to allow the air in the space 14 to expand and contract.

The coffee urn 15 is provided in its bottom with a drain 20, which registers with an opening 21 in the bottom of the inner jacket 13 and also with a drain nipple 22. The drain nipple is preferably secured to the bottom of the inner jacket 13 and extends through the bottom of the jacket 10 and into the water-space 11. A drainpipe 23 is connected with the drain nipple 22 at one end, having its other end passed through the outer casing 5 where it is provided with a faucet 24 from which the coffee may be dispensed. Arranged in the top of the coffee urn is a discharge-pipe 25, the inner end of which is bent downwardly and is disposed over the center of the coffee receptacle, where it is provided with a spray nozzle 26. The outer end of the discharge-pipe 25 is connected with a discharge side of a pump 27, preferably of the centrifugal type, by means of a pipe 28. The suction side of the pump 27 is connected with the outer end of the pipe 23, and a valve 29 is arranged at the suction side of the pump. It is obvious that the connection of the suction side of the pump to the drainpipe 23 is such that the operation of the faucet 24 is independent of this connection. By this arrangement the coffee in the coffee receptacle 15 may be recirculated by the pump.

In order to supply heated water to the coffee receptacle 15, I provide a syphon-pipe 30, which passes through the side of the outer casing at a point near its top and extends downwardly into the water-space 11 to a point near the bottom thereof. The upper end of the syphon-pipe 30 is connected to the pipe 28 and has a valve 31 located in it, whereby the supply of water from the space 11 may be controlled. When it is desired to add water to the coffee receptacle 15, the valve 29 having been closed, the valve 31 is opened, whereby water from the water-space 11 will be forced up through the syphon-pipe 30 past valve 31 and into pipe 25 whence it will be discharged through the nozzle 26 into the receptacle.

A pipe coil 35 is arranged within the recess 36 of the cup-shaped portion 7 of the bottom 6, and it is connected by means of pipes 37 to the bottom of the inner jacket 13, whereby the water in the space 16 of said jacket will be circulated through the pipe coil 35 and thus heated. So as to conduct heat up into the cup-shaped portion 7, a pipe 38 is provided. This pipe has its lower end connected to the cup-shaped portion 7 and its upper end passed through the outer casing 5 near the top thereof. This not only serves to conduct heat into and through the recess 36 of the cup-shaped portion 7 but also utilizes the heat passing through the pipe 38 in heating the water contained in the water-space 11. The bottom 6 of the water-space 11 is, of course, in contact with the heat produced by the heater (not shown), but so as to more effectively heat this water a pipe coil 39 is provided. This coil has its ends connected to the bottom 6, whereby the water in the space 11 will be circulated through the coil.

Obviously, some modifications of the details herein shown and described may be made without departing from the spirit of my invention or the scope of the appended claims; and I do not therefore, wish to be limited to the exact embodiment herein shown and described, the form shown being merely a preferred embodiment thereof.

Having thus described my invention, what I claim is:

1. A coffee urn comprising an outer casing, a water space within the casing, a coffee receptacle interiorly supported by the casing, a water-space surrounding the receptacle, and a dead air-space interposed between the two water-spaces.

2. A coffee urn comprising a coffee receptacle, an inner jacket surrounding such receptacle and provided with an inner water-space, a jacket arranged in interspaced relation with the inner jacket thereby providing a dead air-space, and an outer casing surrounding the jacket, whereby an outer water-space is provided.

3. A coffee urn comprising an outer casing, a water-space within the casing, a coffee receptacle interiorly supported by the casing, a water-space surrounding the receptacle, a dead air-space interposed between the two water-spaces, and a heating coil for each of the water-spaces.

4. A coffee urn comprising a coffee receptacle, an inner jacket surrounding such receptacle and provided with an inner water-space, a jacket arranged in interspaced relation with the inner jacket thereby providing a dead air-space, an outer casing surrounding the jacket, whereby an outer water-space is provided, and a heating coil for each of the water-spaces.

5. A coffee urn comprising an outer casing, having a bottom provided with a cup-shaped portion, a water-space within the casing, a coffee receptacle interiorly supported by the casing, and a vent pipe connected to the cup-shaped portion, passing through the water-space and extending through the outer jacket at a point near the top thereof.

6. A coffee urn comprising an outer casing having a bottom provided with a cup-shaped portion, an outer water-space within the casing, a coffee receptacle interiorly supported by the casing, an inner water-space surrounding the receptacle, a dead air-space interposed between the two water-spaces, and a vent pipe connected to the cup-shaped portion, passing through the water-space and extending through the outer casing at a point near the top thereof.

7. A coffee urn comprising an outer casing, having a bottom provided with a cup-shaped portion, an outer water-space within the casing, a coffee receptacle interiorly supported by the casing, an inner water-space surrounding the receptacle, a dead air-space interposed between the two water-spaces, a heating coil disposed within the cup-shaped portion and connected with the inner water-space, and a heating coil disposed below the bottom of the inner water-casing and connected with the outer water-space.

8. A coffee urn comprising an outer casing, having a bottom provided with a cup-shaped portion, an outer water-space within the casing, a coffee receptacle interiorly supported by the casing, an inner water-space surrounding the receptacle, a dead air-space interposed between the two water-spaces, a vent pipe connected to the cup-shaped portion, passing through the water-space and extending through the outer casing at a point near the top thereof, a heating coil disposed within the cup-shaped portion and connected with the inner water-space, and a heating coil disposed below the bottom of the casing and connected with the outer water-space.

In testimony whereof, I have hereunto signed my name.

LEO WERTHEIMER.